(12) United States Patent
Miura

(10) Patent No.: US 7,830,633 B2
(45) Date of Patent: Nov. 9, 2010

(54) AMPLITUDE LEVEL CONTROLLER FOR HEAD IC, READ CIRCUIT AND MEDIA STORAGE DEVICE

(75) Inventor: Hajime Miura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 206 days.

(21) Appl. No.: 12/199,329

(22) Filed: Aug. 27, 2008

(65) Prior Publication Data

US 2009/0141386 A1 Jun. 4, 2009

(30) Foreign Application Priority Data

Nov. 30, 2007 (JP) ............................. 2007-309679

(51) Int. Cl.
*G11B 5/02* (2006.01)
*G11B 5/09* (2006.01)
(52) U.S. Cl. .......................................... 360/67; 360/46
(58) Field of Classification Search ................ None
See application file for complete search history.

(56) References Cited

U.S. PATENT DOCUMENTS

| 5,955,921 | A * | 9/1999 | Ide et al. ..................... 330/254 |
| 6,018,554 | A * | 1/2000 | Glover ........................ 375/345 |
| 2008/0100944 | A1* | 5/2008 | Matsui et al. ................. 360/46 |
| 2008/0123212 | A1* | 5/2008 | Amemiya .................... 360/67 |

FOREIGN PATENT DOCUMENTS

| JP | A 60-114008 | 6/1985 |
| JP | A 10-21647 | 1/1998 |

* cited by examiner

*Primary Examiner*—Daniell L Negrón
*Assistant Examiner*—Regina N Holder
(74) *Attorney, Agent, or Firm*—Greer, Burns & Crain, Ltd.

(57) ABSTRACT

A head IC adjusts an amplitude level of a read signal of a head and outputs to a read channel having an AGC amplifier, includes an AGC amplifier. The AGC amplifier has a feedback loop control type first amplifier and a feed-forward control type second amplifier. The precision of control with respect to a target value is improved, and an AGC amplifier with fast response can be configured. Further, increases in the AGC pull-in type can be prevented, stability can be assured, and erroneous AGC judgments can be prevented.

17 Claims, 8 Drawing Sheets

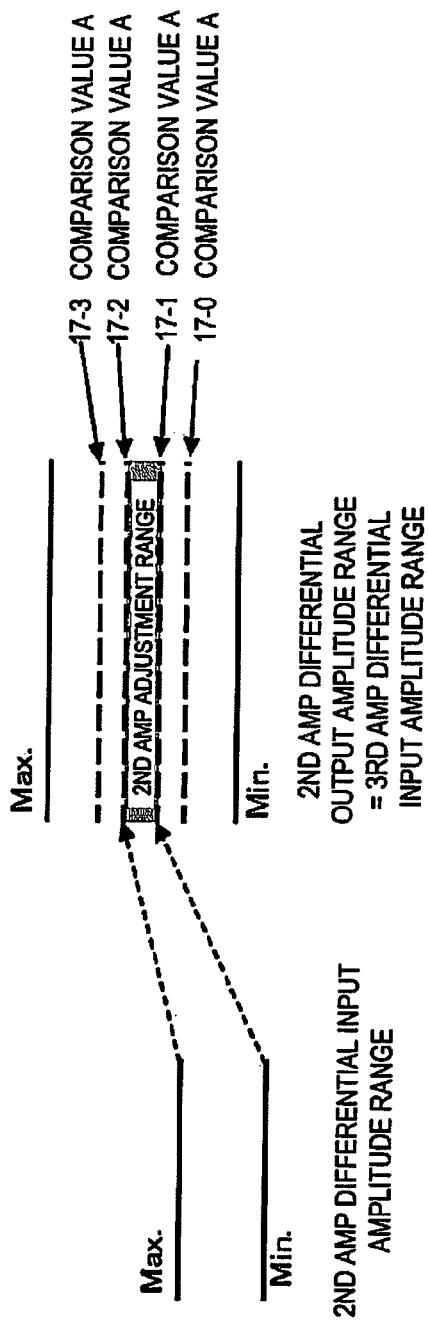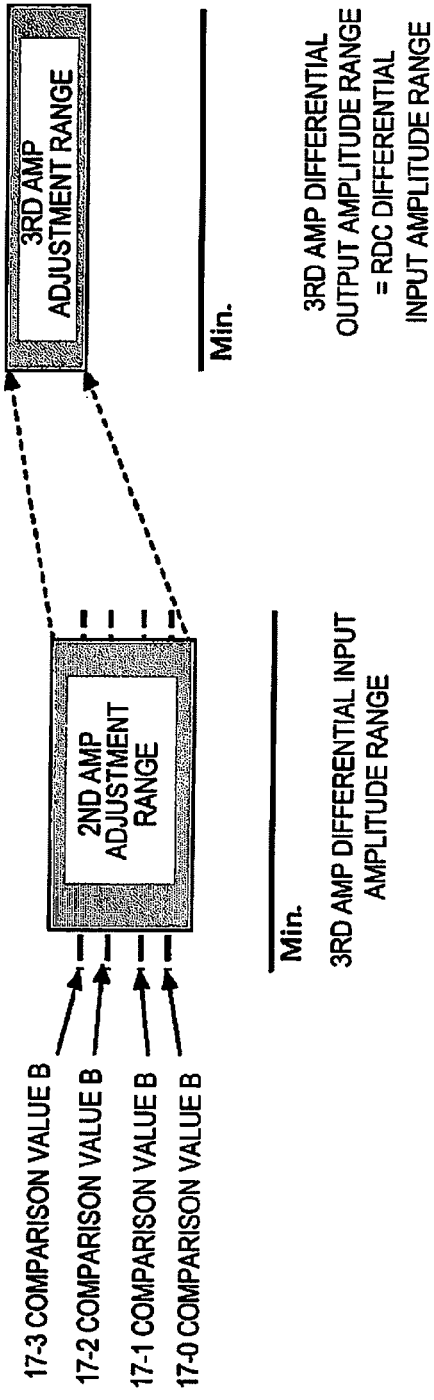
FIG. 5
FIG. 6

AMPLITUDE LEVEL CONTROLLER FOR HEAD IC, READ CIRCUIT AND MEDIA STORAGE DEVICE

CROSS-REFERENCE TO RELATED APPLICATIONS

This application is based upon and claims the benefit of priority from the prior Japanese Patent Application No. 2007-309679, filed on Nov. 30, 2007, the entire contents of which are incorporated herein by reference.

BACKGROUND OF THE INVENTION

1. Field of the Invention

The present invention relates to a head IC, a read circuit, and a media storage device which adjusts output levels of read signals of a head, and more particularly to a head IC, read circuit, and a media storage device which adjusts the read signals of heads having different output levels to a predetermined level.

2. Description of the Related Art

In a media storage device, such as a magnetic disk device, a head reads data from media. Along with an increase in track density in recent years, heads having high sensitivity in detecting the magnetic flux on the media are being provided. An MR (Magnetic Resistance) element is used for a read head, for example. On the other hand, the use of a TuMR (or TMR) element, which utilizes the tunnel effect, is under consideration as an element having an even higher detection sensitivity.

The output level of such a read element is not constant, but changes depending on the characteristic change of the element due to temperature change and the fluctuation of the floating amount. Therefore a circuit to adjust the output level of the read element is required before demodulating data.

FIG. 9 is a diagram depicting a configuration of a conventional media storage device, and FIG. 10 is a block diagram of a conventional read circuit. As FIG. 9 shows, magnetic heads 202a and 202b, to read data on media (magnetic disk) 210, are disposed at the tip of an actuator 200.

The actuator 200 rotates around a rotation axis 204 and positions the magnetic heads 202a and 202b on a desired track of the magnetic disk 210. The magnetic heads 202a and 202b are connected to a head IC 220 provided on the actuator 200, and the head IC 220 is connected to a control circuit 230 outside the actuator 200.

Since the distances from the magnetic heads 202a and 202b to the control circuit 230 are long, the signal levels of the magnetic heads 202a and 202b may change, and noise may enter, so the head IC 220 is disposed between the magnetic heads 202a and 202b and the control circuit 230 and adjusts the signal level. This head IC 220 also plays a part of integrating many signal lines between the magnetic head and the control circuit to simplify wiring. For example, the control circuit 230 and the head IC 220 are connected via a serial interface, and the head IC 220 and each magnetic head 202a and 202b are connected with individual signal lines.

FIG. 10 is a detailed diagram of a read system circuit in FIG. 9, where a variable gain amplifier (preamplifier) 220-1 is disposed in the head IC 220, which is connected to a read element 202-1 of the magnetic head 202a (or 202b). The variable gain amplifier 220-1 amplifies the output of the read element 202-1 at a gain which is set. In the variable gain amplifier 220-1, the number of settings in the gain adjustment range is about four, and gain is set and adjusted for each head before the device is shipped.

In the control circuit 230, which is connected to the head IC 220, a read channel 230-1 is disposed, and an AGC (Automatic Gain Control) amplifier 230-2, disposed in the read channel 230-1, receives output from the variable gain amplifier 220-1 of the head IC 220.

The AGC amplifier 230-2 is comprised of a differential amplifier 230-3 and an AGC circuit 230-4. The AGC circuit 230-4 compares an output value of the differential amplifier 230-3 and a reference output value, feeds back the comparison result to adjust the gain of the differential amplifier 230-3, and adjusts the output level of the differential amplifier 230-3 to the reference level (e.g. see Japanese Patent Application Laid-Open No. H10-021647 (FIG. 1 and others)).

The AGC circuit 230-4 sets a high-speed feedback coefficient (frequency, gain change amount) which follows up a change in one sector of a track of the magnetic disk 210, and equalizes the signal level within one sector.

In the prior art, the fluctuation of the output level caused by the characteristics of the element itself and the fluctuation, due to environmental conditions, including the floating amount change, are mainly adjusted by the AGC amplifier of the read channel.

However use of the TuMR element, which has a higher detection sensitivity than this read element, is desired, due to the recent increase in recording density. This read element having a high detection sensitivity is about 10 times that of an MR element, but dispersion of the signal output level is also high accordingly.

Also the fluctuation of the signal level, due to the fluctuation of temperature and floating amount, is also high because the detection sensitivity is high. And such major fluctuations of the signal level could make adjustment by the AGC amplifier in the read channel difficult.

Also because of the increase in recording density, circuit frequency has increased, and a high-speed AGC amplifier of the read channel is also demanded, but the input dynamic range of the AGC of the high-speed AGC amplifier is narrow. As a result, it is difficult to adjust the fluctuation of the level by changing the AGC amplifier of the read channel.

It could be possible to adjust the setting value of the variable gain amplifier, but adjusting the setting value of the variable gain amplifier is difficult since the number of steps are few. It could be possible to adjust the setting value of the variable gain amplifier by increasing the number of steps, but this spreads the range of the gain setting which is set initially, and adjustment before reading the system area of the disk takes time.

Also since increasing the number of steps requires considering relationships with the dynamic range of the AGC amplifier of the read channel, the adjustment time increases even more, and the adjustment of the level fluctuation is limited.

SUMMARY OF THE INVENTION

Hence an object of the invention is to provide a head IC, read circuit, and media storage device, for automatic adjustment of head output fluctuation, even when there is large variation in the head output level.

A further object of the invention is to provide a head IC, read circuit, and media storage device, for automatic adjustment of head output fluctuation, even when the input dynamic range of the AGC circuit of the read channel is narrow.

Still a further object of the invention is to provide a head IC, read circuit, and media storage device, for automatic adjustment of head output fluctuation, stably and with the time required to adjust head output fluctuation shortened.

In order to attain these objects, a head IC of the invention, which adjusts an amplitude level of head read signals and outputs the signals to a read channel having an AGC amplifier, has a first differential amplifier, which amplifies the read signals using a preset first gain value; a second differential amplifier, which amplifies the output of the first differential amplifier using a preset second gain value; and an AGC circuit, which takes a difference between the output amplitude level of the first differential amplifier and a reference level, automatically adjusts a first gain value of the first differential amplifier by feedback loop control according to prescribed pull-in characteristics, and after automatic adjustment of the first gain value of the first differential amplifier, takes a difference between the output amplitude level of the first differential amplifier and a second reference level, and automatically adjusts the second gain value of the second differential amplifier by feed-forward control according to prescribed pull-in characteristics.

Further, a read circuit of this invention, which adjusts an amplitude level of head read signals, has a head IC, which adjusts the amplitude level of readout signals from the head; and a read channel, connected to the head IC and having an AGC amplifier. And the head IC has a first differential amplifier, which amplifies the read signals using a preset first gain value; a second differential amplifier, which amplifies an output of the first differential amplifier using a preset second gain value; and an AGC circuit, which takes a difference between the output amplitude level of the first differential amplifier and a reference level, automatically adjusts the first gain value of the first differential amplifier by feedback loop control according to prescribed pull-in characteristics, and after automatic adjustment of the first gain value of the first differential amplifier, takes the difference between an output amplitude level of the first differential amplifier and a second reference level, and automatically adjusts the second gain value of the second differential amplifier by feed-forward control according to prescribed pull-in characteristics.

Further, a media storage device of this invention has a head which reads media information; a head IC which adjusts an amplitude level of readout signals from the head; and a read channel, connected to the head IC and having an AGC amplifier. And the head IC has a first differential amplifier, which amplifies the read signals using a preset first gain value; a second differential amplifier, which amplifies an output of the first differential amplifier using a preset second gain value; and an AGC circuit, which takes a difference between an output amplitude level of the first differential amplifier and a reference level, automatically adjusts the first gain value of the first differential amplifier by feedback loop control according to prescribed pull-in characteristics, and after automatic adjustment of the first gain value of the first differential amplifier, takes a difference between the output amplitude level of the first differential amplifier and a second reference level, and automatically adjusts the second gain value of the second differential amplifier by feed-forward control according to prescribed pull-in characteristics.

Further, in this invention it is preferable that the AGC circuit adjusts the first gain value of the first differential amplifier so that the center value in the input amplitude level range of the second differential amplifier is a target value, and adjust the second gain value of the second differential amplifier so that the center value in the input amplitude level range of the read channel is a target value.

Further, in this invention it is preferable that the head IC has an interface unit, which receives the first gain value of the first differential amplifier and the second gain value of the second differential amplifier, set from an external device, and first and second switches for selectively setting, in the first and second differential amplifiers, the gain value of the AGC circuit and a gain value from the interface unit.

Further, in this invention it is preferable that the first and second differential amplifiers operate as AGC amplifiers by means of the AGC circuit when the AGC enable signal is on, and that when the AGC enable signal is off, operate as fixed amplifiers using the gain values automatically adjusted by the AGC circuit.

Further, in this invention it is preferable that a first latch circuit for latching a gain value from the first switch and for setting the first gain value in the first differential amplifier, and a second latch circuit for latching a gain value from the second switch and for setting the second gain value in the second differential amplifier, be further provided.

Further, in this invention it is preferable that the interface unit reads to an external device, as initial values from the first and second latch circuits, gain values obtained by operating the AGC circuit by means of the AGC enable signal, and receives the read-out initial values from the external device, and outputs the values to the first and second switches.

Further, in this invention it is preferable that a head switching unit be provided which, in response to a head selection signal, connects to any one of a plurality of heads the first differential amplifier, and that the interface unit receives the gain values for the selected head and set gain values corresponding to the selected head in the first and second differential amplifiers.

An AGC amplifier is provided in the head IC, so that the amplitude levels of readout signals from the head are automatically adjusted within the head IC, and signal levels can be adjusted to within the input dynamic range of the read channel AGC amplifier. Further, by providing in this AGC amplifier a feedback loop control type first amplifier and feed-forward control type second amplifier, the precision of control with respect to a target value is improved, and an AGC amplifier with fast response can be configured. Further, increases in the AGC pull-in type can be prevented, stability can be assured, and erroneous AGC judgments can be prevented.

BRIEF DESCRIPTION OF THE DRAWINGS

FIG. 5 explains AGC operation of the second amplifier of the head IC of FIG. 2;

FIG. 6 explains AGC operation of the third amplifier of the head IC of FIG. 2;

DESCRIPTION OF THE PREFERRED EMBODIMENTS

Below, embodiments of the invention are explained, in the order of a media storage device, a first embodiment of a read circuit, read circuit operation, a second embodiment of a read circuit, and other embodiments; however, the invention is not limited to these embodiments.

(Media Storage Device)

Figure 1:
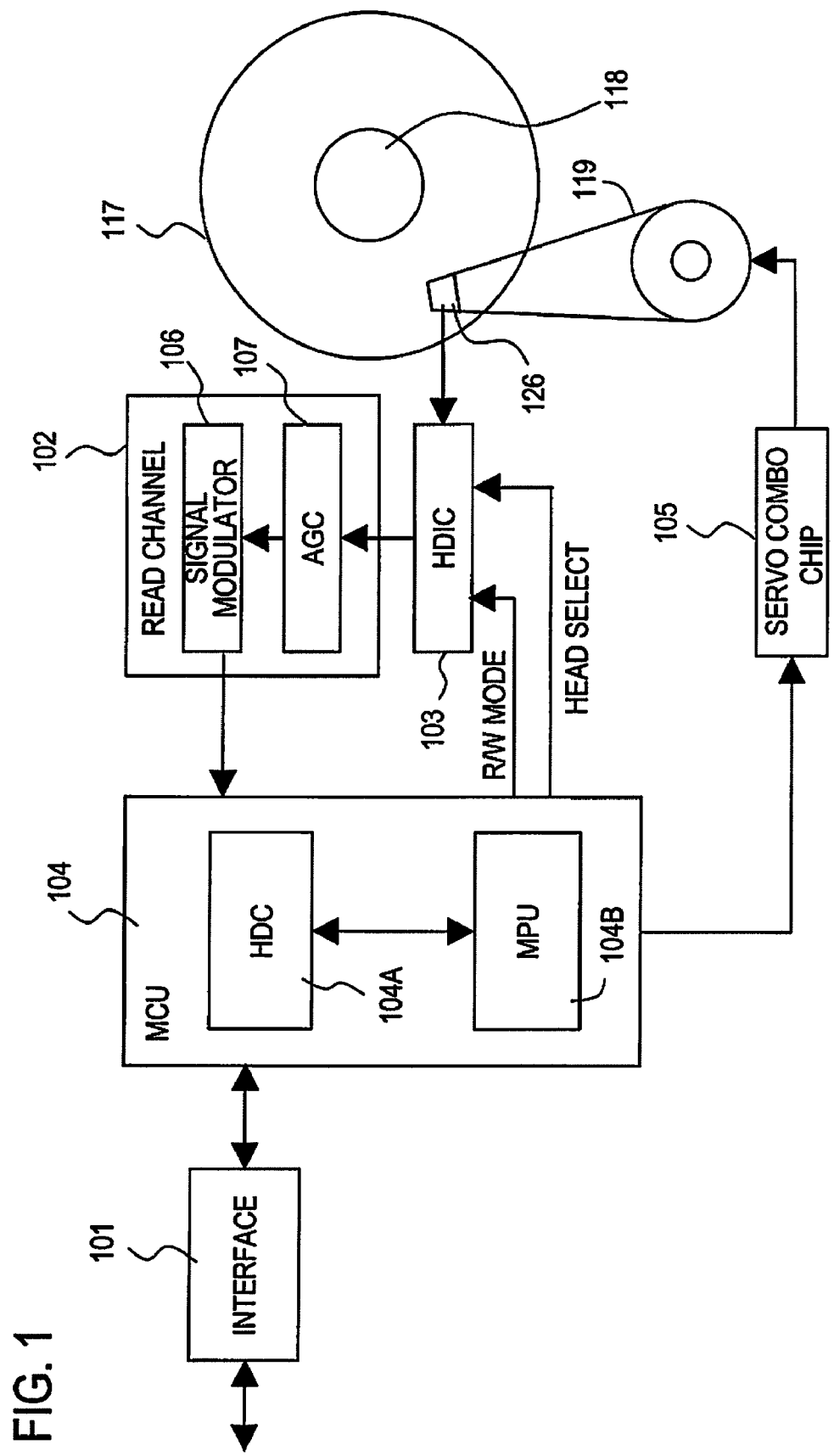
FIG. 1 is a diagram depicting a configuration of a media storage device according to an embodiment of the present invention.

FIG. 1 is a diagram depicting a configuration of a media storage device according to an embodiment of the present invention. FIG. 1 shows a magnetic disk device as the media storage device. As FIG. 1 shows, a magnetic disk 117, which is a magnetic storage media, is installed on a rotation axis 118 of a spindle motor. The spindle motor rotates the magnetic disk 117. An actuator (VCM) 119 has a magnetic head 126 at the tip, and moves the magnetic head 126 in the radius direction of the magnetic disk 117.

The actuator 119 is composed of a voice coil motor (VCM) which rotates around the rotation axis. When two magnetic disks 117 are installed on the magnetic disk device, four magnetic heads 126, for reading/writing each surface of magnetic disks, are simultaneously driven by the same actuator 119.

The magnetic head 126 is comprised of a read element and a write element. For example, the magnetic head 126 is constructed by layering a read element, including a tunnel effect magneto-resistance (TuMR) element, on a slider, and layering a write element, including a write coil, thereon.

Figure 9:
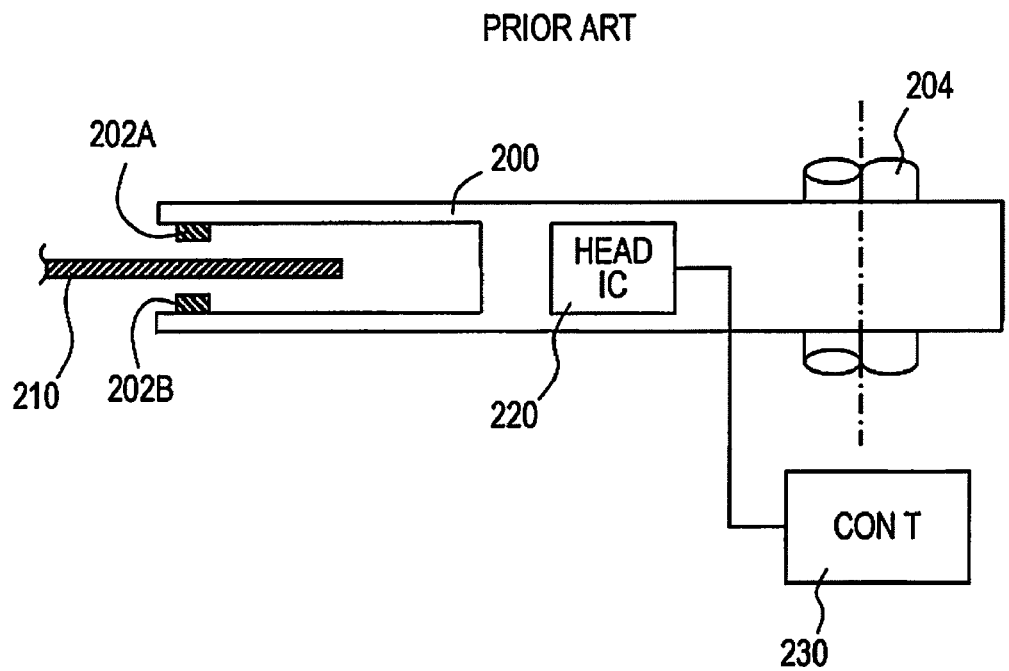
FIG. 9 is a diagram depicting a configuration of a conventional media storage device.
Figure 10:
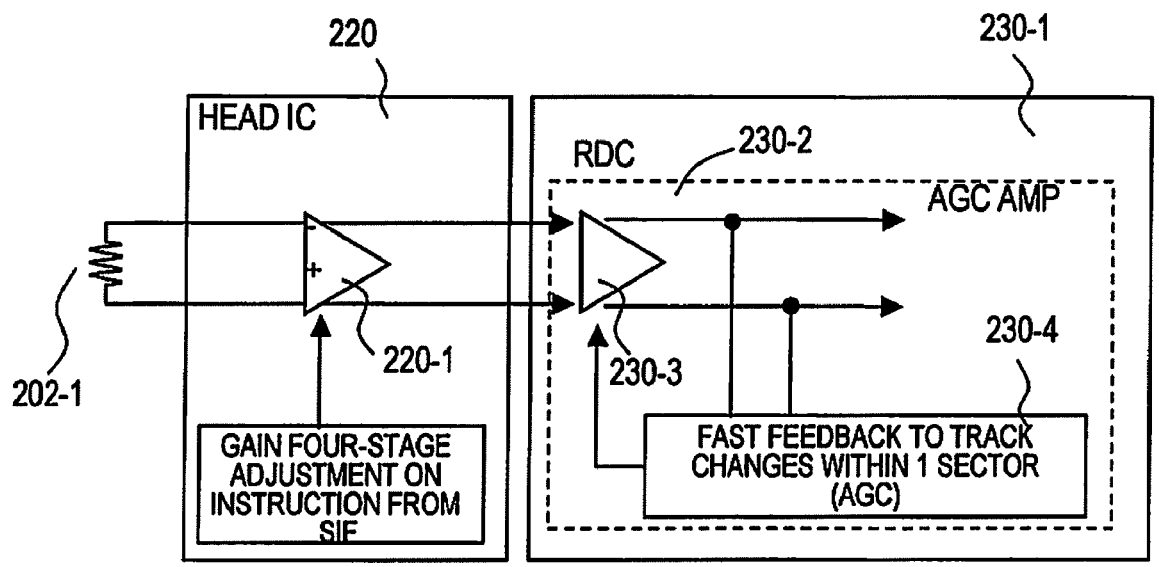
FIG. 10 is a block diagram of a conventional read circuit.

A head IC 103 is disposed on a side face of the actuator 119, as shown in FIG. 9, and is comprised of a read system circuit, including an AGC amplifier, and a write circuit, as described in FIG. 2 and later. The head IC amplifies a read signal from the read element of the magnetic head 126 and outputs it in read mode, and supplies write drive current to the write element of the magnetic head 126 in write mode.

A read channel 102 has a read system circuit and a write systems circuit. And the read system circuit further has an AGC amplifier 107 and a signal demodulation circuit 106. A micro controller (MCU) 104 has a hard disk controller (HDC) 104a and a microprocessor (MPU) 104b.

The hard disk controller (HDC) 104a analyzes a command, judges a position in a track based on a sector number of a servo signal, controls recording/reproducing of data, and temporarily stores read data or write data. The MPU 104b controls each unit, and also detects (demodulates) a current position based on a servo position signal from the signal demodulation circuit 106, and computes a VCM drive command value for the actuator 119, according to an error between the detected current position and the target position.

A servo combo circuit 105 drives an actuator 119 (supplies drive current) using a VCM drive command value, and also drives the spindle motor. An interface circuit 101 communicates with a host using such an interface as USB (Universal Serial Bus), SATA (Serial AT Attached) or SCSI (Small Component System Interface).

Servo signals (position signals) are disposed on the magnetic disk 117 in a circumferential direction in each track from the outer circumference to the inner circumference of the disk 117. Each track is comprised of a plurality of sectors, and servo signals are recorded in each sector. A servo signal is comprised of a servo mark, a track number, index, offset information (servo burst) PosA, PosB, PosC and PosD.

This position signal is read by the head 126, and the position of the magnetic head in the radius direction is detected using the track number and the offset information PosA, PosB, PosC and PosD. Also based on the index signal Index, the position of the magnetic head in the circumference direction is detected.

In order to read these position signals and data, the level of the read output of the read element of the magnetic head 126 is adjusted by the head IC 103, and is adjusted to a predetermined level by the AGC circuit 107 of the read channel 102.

First Embodiment of a Read Circuit

Figure 2:
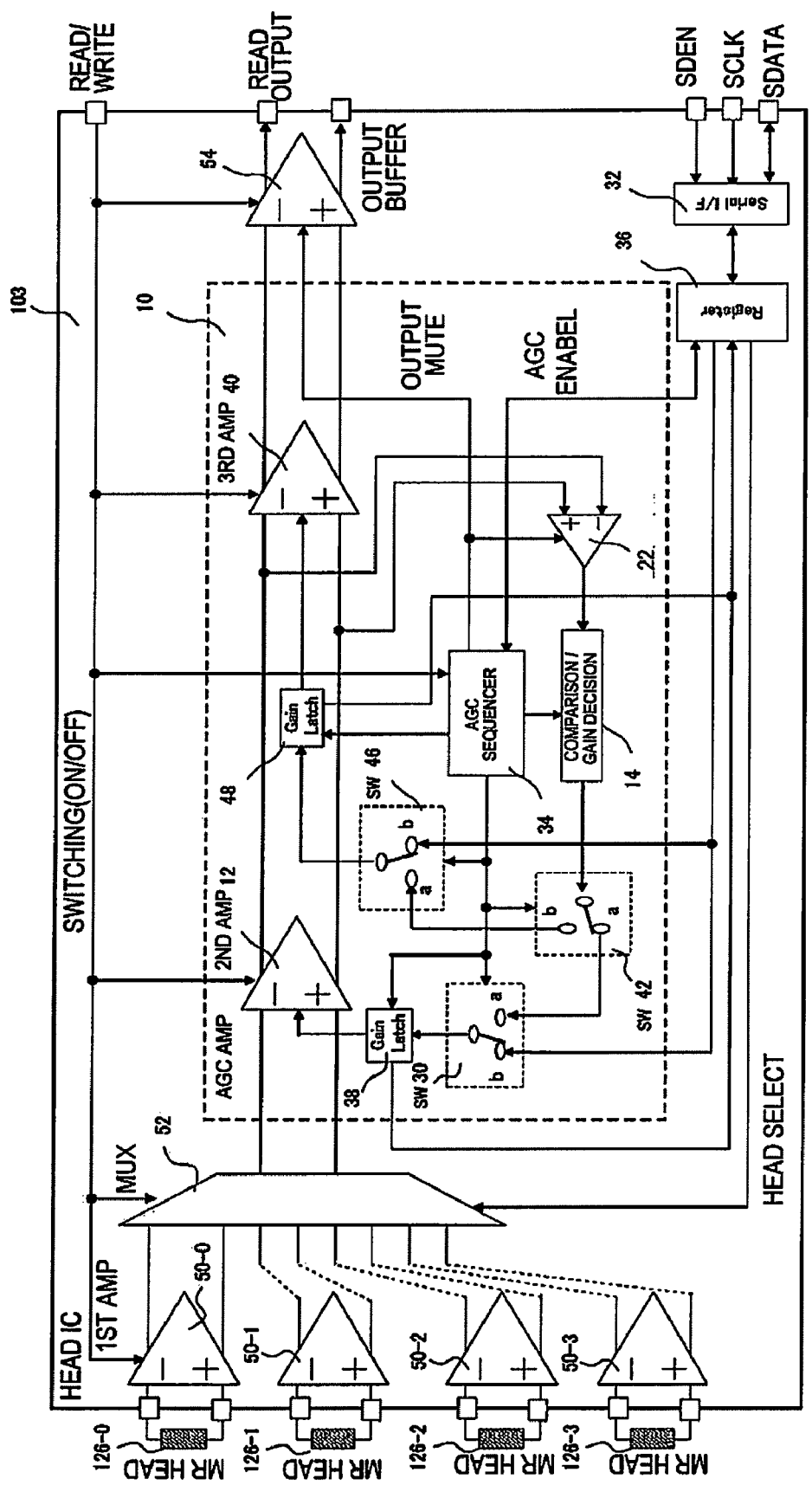
FIG. 2 is a circuit diagram of a first embodiment of a read circuit of the invention.
Figure 3:
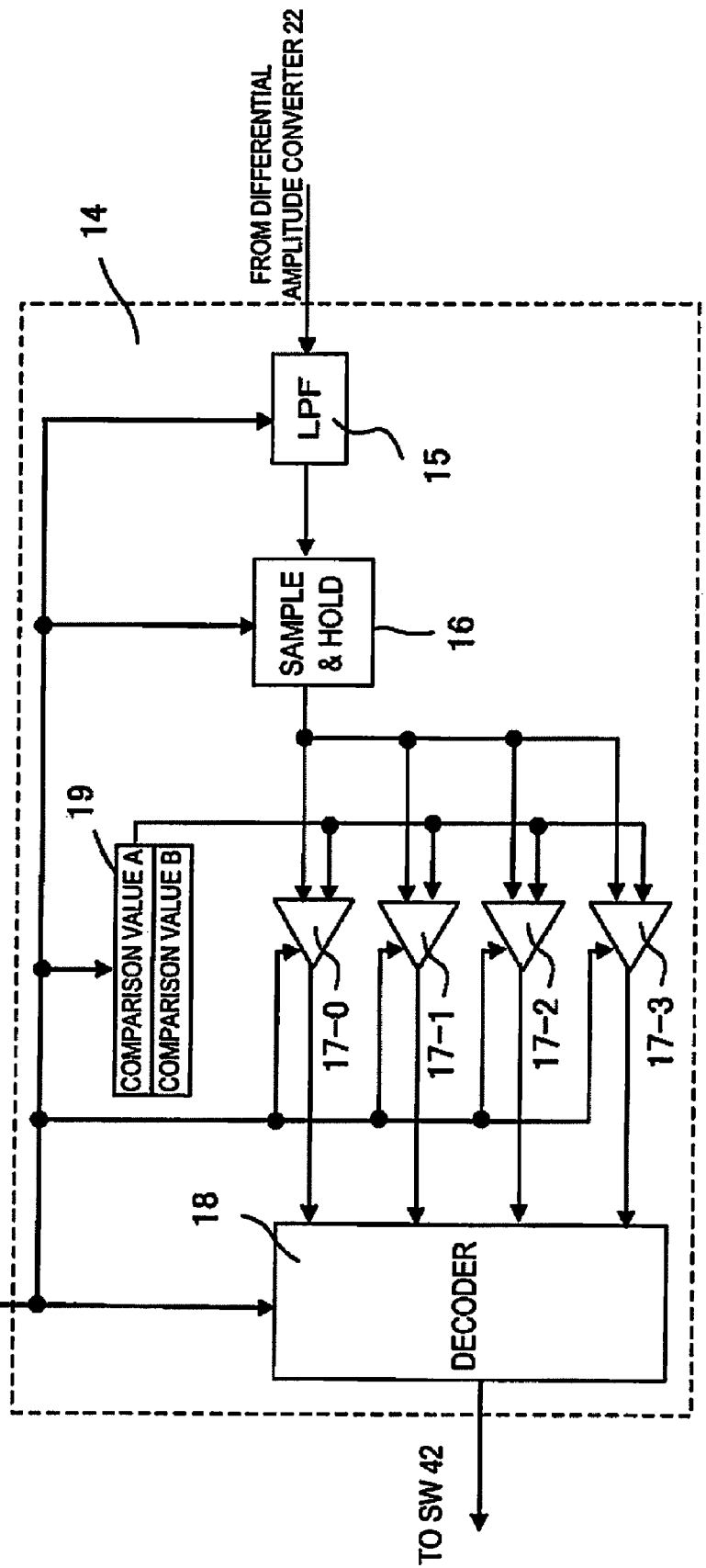
FIG. 3 is a circuit diagram of the comparison/gain decision circuit in FIG. 2.

FIG. 2 is a circuit diagram of a first embodiment of a read circuit of the invention, and FIG. 3 is a circuit diagram of the comparison/gain decision circuit in FIG. 2. In FIG. 2, portions which are the same as those shown in FIG. 1 are indicated by the same symbols; the head IC 103 is connected to four (four channels) read elements (TuMR elements) 126-0 to 126-3.

The head IC 103 has preamplifiers 50-0 to 50-3 for amplifying the outputs of each read element 126-0 to 126-3, and a head selection circuit (multiplexer) 52 for selecting an output of one of the preamplifiers 50-0 to 50-3 by a head selection signal.

The head IC 103 has an AGC amplifier portion 10. This AGC amplifier portion 10 has a second differential amplifier 12, to which the output voltages from the first differential amplifiers 50-0 to 50-3 are input from a multiplexer 52, and a third differential amplifier 40, which amplifies the output of the second differential amplifier 12.

Further, the AGC amplifier portion 10 has a differential amplitude converter 22 which takes the difference between the minus-side output voltage of the second differential amplifier 12 and the plus-side output voltage of the second differential amplifier 12 and extracts the amplitude of the difference signal, a comparison/gain decision circuit 14 (described below in FIG. 3) which compares the extracted amplitude with a reference value and decides the gain, and an AGC sequencer 34 which controls AGC operation.

Further, the AGC amplifier portion 10 has a first gain latch circuit 38 which latches the gain value of the second differential amplifier 12, and a second gain latch circuit 48 which latches the gain value of the third differential amplifier 40.

The AGC amplifier portion 10 further has a first switch 42 which, according to instructions from the AGC sequencer 34, switches the output of the comparison/gain decision circuit 14 to either the second switch 30 or to the third switch 46, a second switch 30 to connect the first gain latch circuit 38 to either the first switch 42 or to the register 36 described below, and a third switch 46 to connect the second gain latch circuit 48 to either the first switch 42 or to the register 36 described below.

The head IC 103 has a serial interface unit 32 which receives the serial data enable signal SDEN and serial clock SCLK from the MCU 104, and which transmits and receives serial data SDATA to and from the MCU 104, and a register 36 to pass exchange data between internal portions and the serial interface unit 32. The head IC 103 also has a buffer amplifier 54 to output the output of the third amplifier 40 to the AGC amplifier 107 of the read channel 102.

As shown in FIG. 3, the comparison/gain decision circuit 14 has a low pass filter 15, a sample & hold circuit 16, comparators 17-0 to 17-3, a decoder 18, and a comparison value setting circuit 19. And the AGC sequencer 34 controls each circuit on/off, operation timing, and similar.

The low pass filter 15 cuts off high-frequency components of the differential amplitude signals from the differential amplitude converter 22, and prevents erroneous AGC operation due to noise. The sample & hold circuit 16 holds the peak value of the differential amplitude signals from the low pass filter 15 until the gain value of the differential amplifier is decided by the decoder 18. The comparison value setting circuit 19 stores the comparison value A of the second amplifier 12 and the comparison value B of the third amplifier 40, described below, and during AGC adjustment of the second amplifier 12 the comparison value A is selected, whereas during AGC adjustment of the third amplifier 40 the comparison value B is selected.

The comparators 17-0 to 17-3 compare the peak values of differential amplitude signals from the sample & hold circuit 16 with comparison values from the comparison value setting circuit 19, and if a peak value is equal to or greater than a comparison value, outputs a logic signal "1", but if a peak value is less than a comparison value, outputs a logic signal "0".

The decoder 18 receives the logic signals from the comparators 17-0 to 17-3, decides the gain values of the second and third differential amplifiers 12 and 40 according to the combination of logic signals, and sends values to the switch 42.

In this way, the AGC amplifier portion 10 comprises two series-connected differential amplifiers 12 and 40, and moreover the former-stage differential amplifier 12 comprises a feedback loop-controlled AGC amplifier, while the latter-stage differential amplifier 40 comprises a feed-forward AGC amplifier. This operation is explained below.

(Read Circuit Operation)

Figure 4:
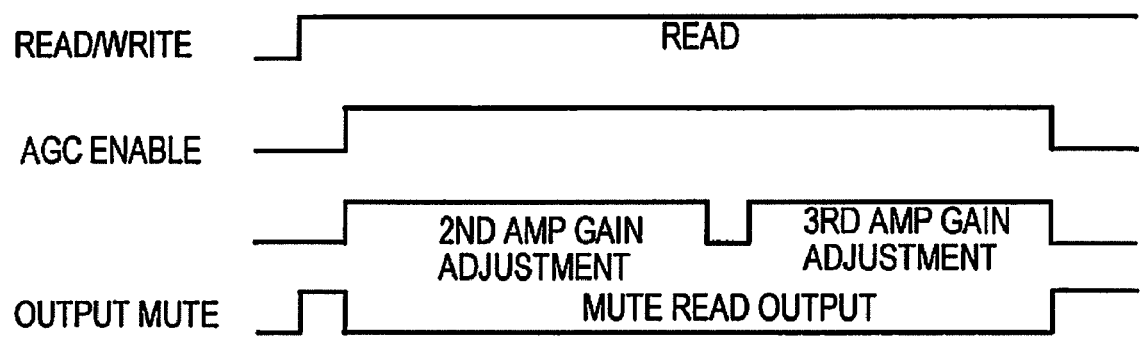
FIG. 4 explains operation of the AGC sequencer of FIG. 2.

FIG. 4 explains operation of the AGC sequencer of FIG. 2, FIG. 5 explains AGC operation of the second amplifier of the head IC of FIG. 2, and FIG. 6 explains AGC operation of the third amplifier of the head IC of FIG. 2.

As shown in FIG. 4, upon receiving a read signal from the read/write terminal, the head IC 103 enters read mode, enables the first amplifiers 50-0 to 50-3, multiplexer 52, second amplifier 12, third amplifier 40, and output buffer amplifier 54, and forms a read path. At the same time, the AGC sequencer 34 is enabled.

The serial interface unit 32 receives a head selection signal (including a selected head number) from the MCU 104, and sets the head selection signal in the head selection data area of the register 36. By this means, the head selection signal is provided to the multiplexer 52 from the register 36, and the multiplexer 52 selects and outputs the output of the head indicated by the head selection signal (that is, the output of a first amplifier), and moreover disables the unselected first differential amplifiers. There is no limit to the timing with which the MCU 104 sends a head selection signal to the head IC 103, and the signal may be sent either before or after the head IC 103 enters read mode.

When the head IC 103 enters read mode, upon automatic adjustment of gain values in the AGC amplifier portion 10, the MCU 104 sends an AGC enable signal to the serial interface unit 32. This AGC enable signal is set in the register 36, and provided to the AGC sequencer 34.

The AGC sequencer 34 begins adjustment of the gain of the second amplifier 12. That is, the first switch 42 is connected to the "a" side as in FIG. 2, and moreover the second switch 30 is connected to the "a" side. By this means, the comparison/gain decision circuit 14 is connected to the first gain latch circuit 38.

Together with this, the AGC sequencer 34 turns on an output mute signal OUTPUT MUTE, to mute the output buffer amplifier 54, and moreover enables the differential amplitude converter 22. Further, the AGC sequencer 34 instructs the comparison/gain decision circuit 14 to adjust the gain of the second amplifier 12.

As a result, the differential amplitude converter 22 outputs to the comparison/gain decision circuit 14 the difference (differential amplitude signal) between the minus-side voltage and the plus-side voltage of the outputs of the differential amplifier 12.

In the comparison/gain decision circuit 14, the low pass filter 15 cuts off high-frequency components in differential amplitude signals from the differential amplitude converter 22, and prevents erroneous AGC operation due to noise. Next, the sample & hold circuit 16 holds the peak value of differential amplitude signals until the gain value for the differential amplifier 12 is decided by the decoder 18. The comparison value setting circuit 19 outputs comparison values A for the output amplitude of the second amplifier 12 to the comparators 17-0 to 17-3, as shown in FIG. 5.

The comparators 17-0 to 17-3 compare differential amplitude signal peak values from the sample & hold circuit 16 with comparison values A from the comparison value setting circuit 19, and if the peak value is equal to or greater than the comparison value output a logic signal "1", but if the peak value is less than the comparison value output a logic signal "0".

The decoder 18 decides the gain value of the differential amplifier 12 such that the output amplitude value of the second differential amplifier 12 is between the comparison values A of the comparators 17-1 and 17-2 (the output amplitude center value of the second differential amplifier 12), according to the combination of logic signals received from the comparators 17-0 to 17-3, and outputs the result to the first gain latch circuit 38 via the two switches 42 and 30. By this means, the gain value of the second amplifier 12 is automatically adjusted through feedback loop control.

When the prescribed gain adjustment time ends, the AGC sequencer 34 ends gain adjustment for the second amplifier 12. By this means, the gain value of the second amplifier 12 is fixed as the gain held by the first gain latch circuit 38. Then, the AGC sequencer 34 starts gain adjustment for the third amplifier 40.

That is, as shown in FIG. 2, the first switch 42 is connected to side "b", and moreover the third switch 46 is connected to side "a". By this means the comparison/gain decision circuit 14 is connected to the second gain latch circuit 48.

Together with this, the AGC sequencer 34 leaves the output buffer amplifier 54 in the mute state, and moreover leaves the differential amplitude converter 22 in the enabled state. Also, the AGC sequencer 34 instructs the comparison/gain decision circuit 14 to adjust the gain for the third amplifier 40.

As a result, the differential amplitude converter 22 outputs to the comparison/gain decision circuit 14 the difference (difference amplitude signal) between the minus-side voltage and plus-side voltage of the outputs of the differential amplifier 12 (inputs to the differential amplifier 40).

In the comparison/gain decision circuit 14, the low pass filter 15 cuts off high-frequency components in the differential amplitude signal from the differential amplitude converter 22, and prevents erroneous AGC operation due to noise. Next, the sample & hold circuit 16 holds the peak value of the differential amplitude signal until the gain value of the differential amplifier 40 is decided by the decoder 18. The comparison value setting circuit 19, as shown in FIG. 6, outputs comparison values B for the output amplitude of the third amplifier 40 to the comparators 17-0 to 17-3.

The comparators 17-0 to 17-3 compare the differential amplitude signal peak value from the sample & hold circuit 16 with the comparison values B from the comparison value setting circuit 19, and if the peak value is equal to or greater than the comparison value output a logic signal "1", but if the peak value is less than the comparison value output a logic signal "0".

The decoder 18 decides the gain value of the third differential amplifier 40 such that the output amplitude value of the third differential amplifier 40 is the center value of the input amplitude of the read channel 102, according to the combination of logic signals received from the comparators 17-0 to 17-3, and outputs the result to the second gain latch circuit 48 via the two switches 42 and 46. By this means, the gain value of the third amplifier 40 is automatically adjusted by feed-forward control.

When the prescribed gain adjustment time ends, the AGC sequencer 34 ends adjustment of the gain of the third amplifier 40. As a result, the gain of the third amplifier 40 is fixed as the gain value held by the second gain latch circuit 48. After completion of adjustment of the gain of the third amplifier 40, the AGC sequencer 34 turns off the output mute signal, canceling the muting of the output buffer amplifier 54. By this means, the output level is adjusted for the read output from the selected head by the AGC amplifier portion 10, and the read output is output from the output buffer amplifier 54 to the read channel 102.

After all gain adjustment has been completed, the AGC sequencer 34 disables the differential amplitude converter 22 and the comparison/gain decision circuit 14, and returns the switches 42, 30, 46 to the connection state shown in FIG. 2. Further, the AGC sequencer 34 sets the gain value for the second differential amplifier 12 held in the gain latch circuit 38 and the gain value for the third differential amplifier 40 held in the gain latch circuit 48 in the register 36, to update the gain values for the differential amplifiers 12 and 40 held in the register 36. Finally, the AGC sequencer 34 turns off the AGC enable signal, and clears the AGC enable settings in the register 36.

In this way, an AGC amplifier is configured using two amplifiers, which are the second amplifier 12 and the third amplifier 40, and the connection port between the second amplifier 12 and third amplifier 40 is taken to be the AGC control input.

The reason for this configuration is here explained. AGC amplifiers include feedback loop control types and feed-forward control types. In the case of feedback loop control AGC, the precision of control with respect to the target value is high, but when the amplitude of the amplifier output (=AGC control input) has a broad range of from several tens of mVpp (peak-to-peak) to several hundred mVpp, there is large fluctuation in the amplifier output at the start of AGC. In particular, when a TuMR element is utilized as the read element, there may be such variation in the amplitude range among individual read elements.

This fact means that, when feedback loop control AGC alone is used, there are large fluctuations in the AGC feedback loop gain, so that the pull-in time until AGC is stable is increased, and moreover cases may occur in which the AGC does not stabilize.

On the other hand, when using feed-forward control AGC alone, the adjustment result after AGC is not fed back, so that response to gain changes is fast. However, there is the possibility that a gain may be set which is within the read channel input level range, but is not optimal (for example, a gain at which the read output is the maximum value or the minimum value of the read channel input level). Further, because the amplifier input (=AGC control input) signal level is low, there is the possibility of erroneous detection during AGC level discrimination.

In this embodiment, a configuration is adopted in which feedback loop control AGC and feed-forward control AGC are concatenated. And, the AGC sequencer 34 first adjusts the gain value of the second amplifier 12 by feedback loop control (where the control input is the output of the second amplifier 12), according to the sequence shown in FIG. 4. The output level range of the second amplifier 12 is small compared with the amplifier output when feedback control AGC alone is used, and fluctuations in the AGC feedback loop gain can be made small. For this reason, increases in the AGC pull-in time can be prevented, and moreover AGC stability can be ensured.

As shown in FIG. 5, the gain value of the second amplifier 12 is adjusted such that the output amplitude value of the second amplifier 12 takes as a target the center value of the input amplitude range of the third amplifier 40; but as shown in FIG. 5, the adjustment range has a certain width. This is because the number of bits (resolution) of the comparator 17 and the gain value of the second amplifier 12 have finite fixed values.

Next, the AGC sequencer 34 adjusts the gain value of the third amplifier 40 by feed-forward control (the control input is the input of the third amplifier 40). The input amplitude range of the third amplifier 40 is large compared with the amplifier input when feed-forward control type AGC alone is used, and it is possible to prevent erroneous detection during AGC level discrimination.

The third amplifier 40 is adjusted taking as a target the center value of the input amplitude range of the read channel 102 as shown in FIG. 6; but as shown in FIG. 6, the adjustment range has a certain width. The reason for this is the same as the reason in the case of the second amplifier 12.

In this AGC combination, if feedback loop control were used for both the former stage and the latter stage, then as explained above, the convergence time would be lengthened. And if instead the former stage used feed-forward control and the latter stage used feedback loop control, since the former-stage AGC amplifier would have a small input signal, and the gain error of the former-stage feed-forward type AGC would be increased.

In this embodiment, the former stage is configured as feedback loop control type AGC, so that even if the input amplitude were small, the error is decreased, and the latter stage is configured as feed-forward control type AGC, so that convergence time is short for a range of large amplitudes.

As shown in FIG. 4, during AGC gain adjustment the AGC sequencer 34 can mute the read output (amplitude 0 Vpp, output voltage within the input common voltage range of the read channel 102, and ideally at the center value).

Through this muting operation, a situation in which during AGC gain adjustment the read output is input to the read channel 102 and operation of the read channel 102 becomes unstable can be prevented. During AGC operation of the head IC, if the read channel 102 mutes input from the head IC, this function need not be used.

In this way, two AGCs are concatenated, and the AGC gains are adjusted in sequence, so that the comparator 17 may have a comparatively narrow control input range, and can be configured for approximately 4 bits, as in the embodiment. As a result, the circuit scale of the comparison/gain decision circuit can be decreased.

In this way, the head IC 103 has a mode for adjustment of the gain of the AGC amplifiers 12 and 40 by AGC in response to an instruction from an external device, and moreover is configured to also enable use of a mode in which the gain values of the AGC amplifiers 12 and 40 are set using gain values provided from an external device.

That is, as stated above, after completion of all gain adjustment in the head IC 103, the gain value of the second differential amplifier 12 held in the gain latch circuit 38, and the gain value of the third differential amplifier 40 held in the gain latch circuit 48, are set in the register 36, so that the MCU 104 of FIG. 1 can read and store in internal memory the gain values via the serial interface unit 32.

On the other hand, when the AGC enable signal is off, the MCU 104 reads the gain initial values (the previously read-out gain values) from internal memory, and sets the values in the register 36 via the serial interface unit 32. In this case, the second switch 30 and third switch 46 are connected to the "b" side, so that the gain values of the differential amplifiers 12, 40 set in the register 36 are set in the first gain latch circuit 38 and in the second gain latch circuit 48 via the second switch 30 and third switch 46, respectively.

Second Embodiment of a Read Circuit

Figure 7:
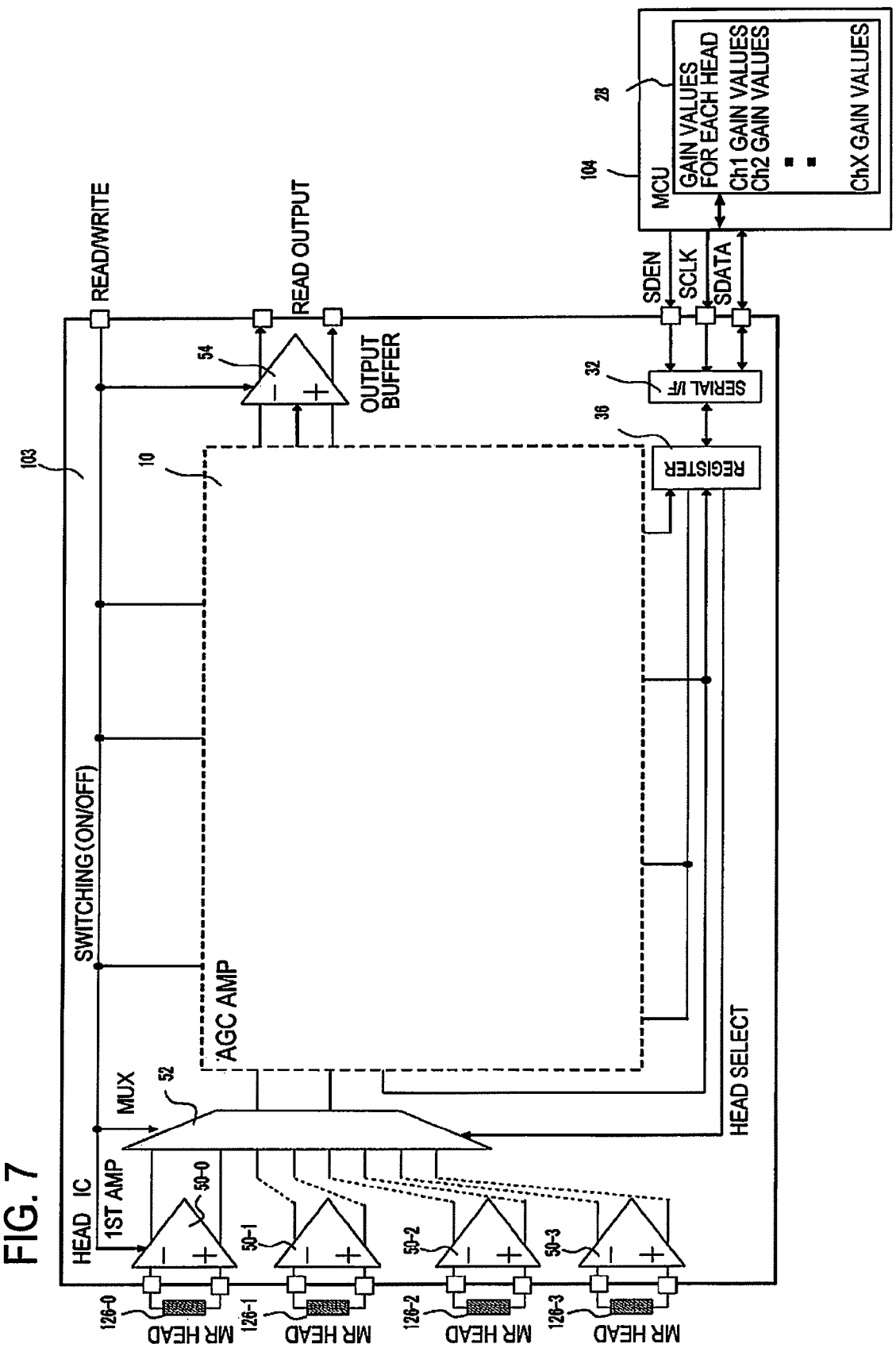
FIG. 7 is a circuit diagram of a second embodiment of a read circuit of the invention.
Figure 8:
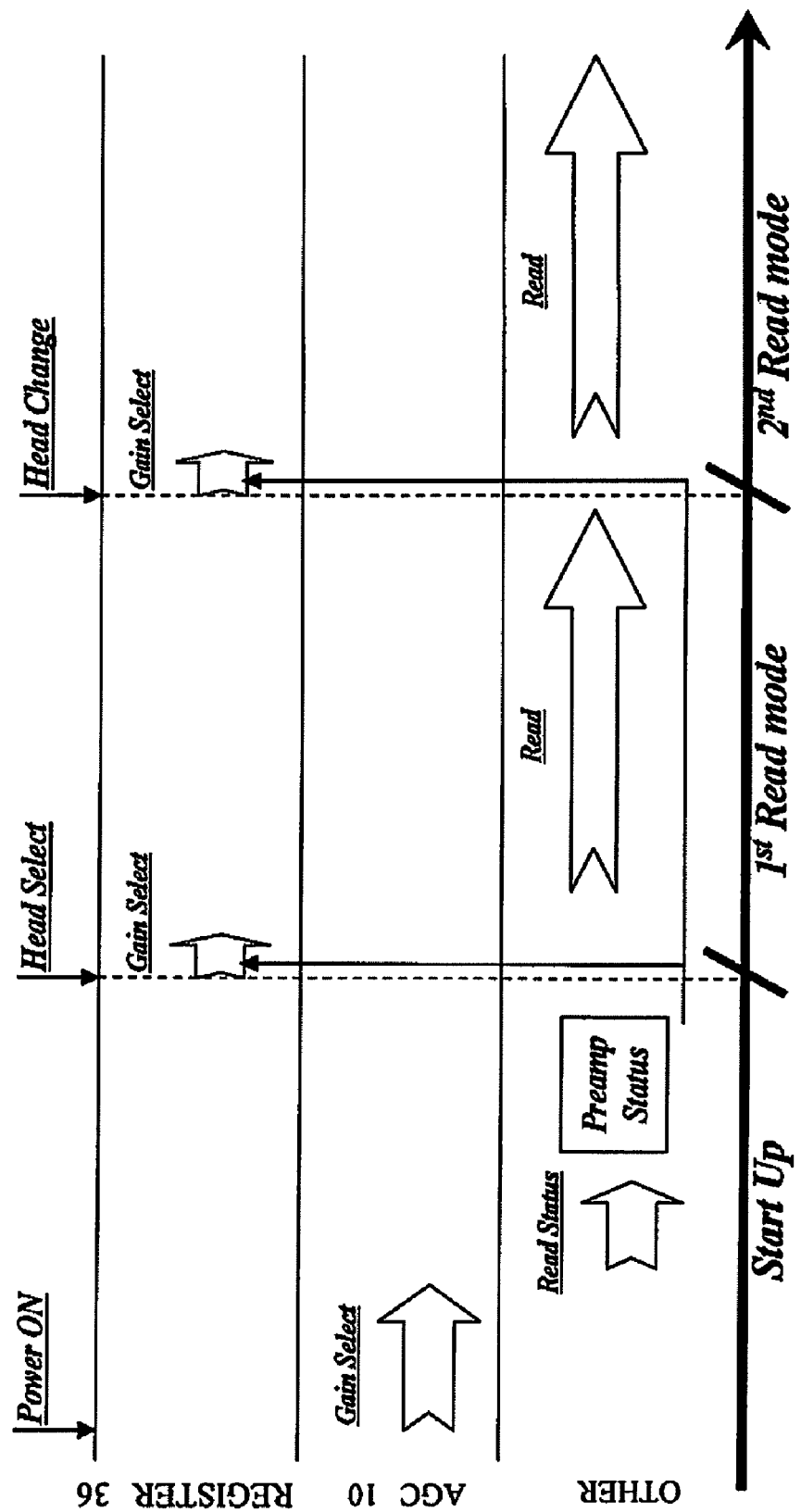
FIG. 8 is an operation sequence diagram of FIG. 7.

FIG. 7 is a circuit diagram of a second embodiment of a read circuit of the invention, and FIG. 8 is an operation sequence diagram. In FIG. 7, portions which are the same as those explained in FIG. 1 and FIG. 2 are assigned the same symbols. In this embodiment, gain memory values for each head (channel) are stored in the memory 28 of the MCU 104 of FIG. 1.

FIG. 8 is used to explain operation of the configuration of FIG. 7. When power is supplied to the magnetic disk device, the MCU 104 transmits to the serial interface unit 32 of the head IC 103 a head selection signal corresponding to the magnetic head 126 which has recorded the system area (SA) of the magnetic disk 117. Next, the MCU 104 transmits to the serial interface unit 32 the read signal and AGC enable signal explained using FIG. 4. As explained in the first embodiment, the head IC 103 performs automatic gain adjustment in the AGC amplifier portion 10.

When the head adjustment time for the head IC 103 has elapsed, the MCU 104 positions the magnetic head 126 in the system area of the magnetic disk 117, and instructs the head IC 103 and read channel circuit 102 to perform reading of system area data.

In the system area of the magnetic disk 117, device status information is recorded (the optimum gain and bias current/voltage for each read head, write waveform boost amounts for each write head, various other settings and parameters). The MCU 104 reads data from the system area of the magnetic disk 117 via the head IC 103 and read channel circuit 102, and after storing the data in memory 28, sets values in various portions. The MCU 104 sets the TuMR element bias current/voltage and write waveform boost amount for the write element in the head IC 103. By this means, preparation for operations to read and write data from and to the magnetic disk 117 are completed.

When performing reading or writing, the MCU 104 provides a head selection signal to the head IC 103. As a result, the multiplexer 52 of the head IC 103 selects the indicated head. Next, the MCU 104 provides two gain initial values (for the differential amplifiers 12 and 40) for the head to the serial interface (SIF) unit 32 of the head IC 103.

As a result, the provided gain initial values are set in the latch circuits 38 and 48 via the register 36 and switches 30 and 46. That is, the differential amplifiers 12 and 40 perform amplification operation using the gain amounts set in this way. That is, operation is performed at fixed gain. Then, data reading is begun using these gain values.

Similarly, when a head change occurs, the MCU 104 provides a head selection signal to the head IC 103, and the multiplexer 52 selects the indicated head. Next, the MCU 104 provides two gain initial values (for the differential amplifiers 12 and 40) for the head to the serial interface (SIF) unit 32 of the head IC 103. As a result, the provided gain initial values are set in the latch circuits 38 and 48 via the register 36 and switches 30 and 46. That is, the differential amplifiers 12 and 40 perform amplification operation using the gain amounts set in this way.

Hence the AGC gain adjustment mode can be used to adjust the initial gain, and even when there is large deviation in the head characteristics, adjustment to an amplitude within the dynamic range of the AGC circuit of the read channel circuit 102 can be performed rapidly.

Further, by storing the adjustment initial values in memory, at the time of head selection the corresponding initial gain values can be read out and set in the AGC amplifier 10, so that the optimal gain can be set without the need for AGC operation. That is, the comparison/gain decision circuit 14, differential amplitude converter 22, and AGC sequencer 34 are not caused to operate, so that a considerable reduction of power consumption is attained. In particular, when the device is mounted in portable equipment, the power supplied is limited, and so this effect in reducing power consumption is substantial. In particular, the AGC execution time can be minimized, so that consequently overall power consumption can be reduced, and moreover read operations can be performed at optimal gain settings even when there is substantial variation among heads.

Further, in this embodiment automatic level adjustment is performed within the head IC 103, so that extra signal lines with external devices are not required. Hence as explained using FIG. 9, such a configuration is optimal for mounting in an actuator.

Other Embodiments

In the above-described embodiments, explanations were given in which the AGC circuit was configured as in FIG. 2 or similarly; however, an analog-format AGC circuit, an AGC circuit having an integration circuit, and other AGC circuits can be employed. Also, examples of the head read circuits of magnetic disk devices were explained, but application to the read circuits of other media storage devices is also possible.

Further, gain adjustment of the second amplifier 12 and third amplifier 40 may be performed at the time of factory shipment, with measured gains for each head (channel) stored in memory (or in the system area of a magnetic disk). And, at the time of the first power-on of the magnetic disk device, gain adjustments of the second amplifier 12 and third amplifier 40 may be performed, and the measured gain values for each head (channel) may be stored in memory (or in the system area of a magnetic disk).

Similarly, during operation of the magnetic disk device, gain adjustments of the second amplifier 12 and third amplifier 40 may be performed as one calibration, and the measured gains for each head (channel) may be used to update the gain in memory (or in the system area of a magnetic disk), either at prescribed time intervals, or when a change in temperature or other change in the environment has occurred, or when the read signal error rate has been measured and the error rate has exceeded a reference value.

The preferred embodiments described herein are therefore illustrative and not restrictive, the scope of the invention indicated by the embodiments and all variations with come within the meaning of the claims are intended to be embraced therein.

An AGC amplifier is provided in the head IC, so that the amplitude from the head is automatically adjusted within the head IC, and adjustment to a signal level within the input dynamic range of the AGC amplifier of the read channel can be performed. Further, by forming this AGC amplifier using a feedback loop control-type first amplifier and a feed-forward control-type second amplifier, an AGC amplifier can be configured with high precision of control with respect to the target value and with fast response. Further, increases in the AGC pull-in time can be prevented, stability can be assured, and erroneous AGC discrimination can be prevented.

What is claimed is:

1. A head IC, which adjusts an amplitude level of head read signals and outputs the signals to a read channel having an AGC amplifier, comprising:
    a first differential amplifier, which amplifies the read signals using a preset first gain value;
    a second differential amplifier, which amplifies output of the first differential amplifier using a preset second gain value; and
    an AGC circuit, which takes a difference between an output amplitude level of the first differential amplifier and a reference level, automatically adjusts said first gain value of the first differential amplifier by feedback loop control according to prescribed pull-in characteristics, so that a center value in the input amplitude level range of the second differential amplifier is a target, and after completion of automatic adjustment of the first gain value of the first differential amplifier, takes a difference between the output amplitude level of the first differential amplifier and a second reference level, and automatically adjusts the second gain value of the second differential amplifier by feed-forward control according to prescribed pull-in characteristics so that the center value in the input amplitude level range of the read channel is a target.

2. The head IC according to claim 1, further comprising:
    an interface unit, which receives the first gain value of the first differential amplifier and the second gain value of the second amplifier, set by an external device; and
    first and second switches for selectively setting the first and second gain values of the AGC circuit and the first and second gain values from the interface unit in the first and second differential amplifiers.

3. The head IC according to claim 1, wherein the first and second differential amplifiers operate as AGC amplifiers by means of the AGC circuit when an AGC enable signal is on, and when the AGC enable signal is off, operate as fixed amplifiers using the gain values automatically adjusted by the AGC circuit.

4. The head IC according to claim 2, further comprising:
    a first latch circuit for latching a gain value from the first switch and setting the first gain value in the first differential amplifier; and
    a second latch circuit for latching a gain value from the second switch and setting the second gain value in the second differential amplifier.

5. The head IC according to claim 4, wherein the interface unit reads to an external device, as initial values from the first and second latch circuits, gain values obtained by operating the AGC circuit by the AGC enable signal, and receives the read-out initial values from the external device, and outputs the values to the first and second switches.

6. The head IC according to claim 2, further comprising a head switching unit, which, in response to a head selection signal, connects any of a plurality of heads to the first differential amplifier,
    wherein the interface unit receives the gain values for the selected head and sets the gain values corresponding to the selected head in the first and second differential amplifiers.

7. A read circuit, which adjusts an amplitude level of read signals from a head, comprising:
    a head IC, which adjusts amplitude levels of the read signals from the head; and
    a read channel, connected to the head IC, and having an AGC amplifier, wherein said head IC comprises:
    a first differential amplifier, which amplifies the read signals using a preset first gain value;
    a second differential amplifier, which amplifies an output of the first differential amplifier using a preset second gain value; and
    an AGC circuit, which takes the difference between the output amplitude level of the first differential amplifier and a reference level, automatically adjusts the first gain value of the first differential amplifier by feedback loop control according to prescribed pull-in characteristics so that the center value in the input amplitude level range of the second differential amplifier is a target, and after completion of automatic adjustment of the first gain value of the first differential amplifier, takes a difference between the output amplitude level of the first differential amplifier and a second reference level, and automatically adjusts the second gain value of the second differential amplifier by feed-forward control according to prescribed pull-in characteristics so that the center value in the input amplitude level range of the read channel is a target.

8. The read circuit according to claim 7, wherein the head IC further comprises:
    an interface unit, which receives the first gain value of the first differential amplifier and the second gain value of the second amplifier, set by an external device; and
    first and second switches for selectively setting the gain values of the AGC circuit and the gain values from the interface unit in the first and second differential amplifiers.

9. The read circuit according to claim 7, wherein the first and second differential amplifiers operate as AGC amplifiers by means of the AGC circuit when an AGC enable signal is on, and when the AGC enable signal is off, operate as fixed amplifiers using the preset gain from an external device.

10. The read circuit according to claim 8, further comprising:
    a first latch circuit for latching a gain value from the first switch and setting the first gain value in the first differential amplifier; and
    a second latch circuit for latching a gain value from the second switch and setting the second gain value in the second differential amplifier.

11. The read circuit according to claim 10, wherein the interface unit reads to an external device, as initial values from the first and second latch circuits, gain values obtained by operating the AGC circuit by the AGC enable signal, and receives the read-out initial values from the external device, and outputs the values to the first and second switches.

12. The read circuit according to claim 8, the head IC further comprising a head switching unit which, in response to a head selection signal, connects any of a plurality of heads to the first differential amplifier,
    wherein the interface unit receives the gain values for the selected head and sets gain values corresponding to the selected head in the first and second differential amplifiers.

13. A media storage device, comprising:
    a head, which reads data from a media;
    a head IC, which adjusts an amplitude level of read signals from the head; and a read channel, connected to the head IC, and having an AGC amplifier, wherein said head IC comprises:

a first differential amplifier, which amplifies the read signals using a preset first gain value;

a second differential amplifier, which amplifies an output of the first differential amplifier using a preset second gain value; and an AGC circuit, which takes a difference between an output amplitude level of the first differential amplifier and a reference level, automatically adjusts the first gain value of the first differential amplifier by feedback loop control according to prescribed pull-in characteristics so that a center value in the input amplitude level range of the second differential amplifier is a target, and after completion of automatic adjustment of the first gain value of the first differential amplifier, takes a difference between the output amplitude level of the first differential amplifier and a second reference level, and automatically adjusts the second gain value of the second differential amplifier by feed-forward control according to prescribed pull-in characteristics so that a center value in the input amplitude level range of the read channel is a target.

14. The media storage device according to claim 13, said head IC further comprising:

an interface unit, which receives the first gain value of the first differential amplifier and the second gain value of the second amplifier, set by an external device; and first and second switches for selectively setting the gain values of the AGC circuit and the gain values from the interface portion in the first and second differential amplifiers.

15. The media storage device according to claim 13, wherein the first and second differential amplifiers operate as AGC amplifiers by means of the AGC circuit when an AGC enable signal is on, and when the AGC enable signal is off, operate as fixed amplifiers using the gain values automatically adjusted by the AGC circuit.

16. The media storage device according to claim 14, said head IC further comprising:

a first latch circuit for latching a gain value from the first switch and for setting the first gain value in the first differential amplifier; and a second latch circuit for latching a gain value from the second switch and setting the second gain value in the second differential amplifier.

17. The media storage device according to claim 16, wherein the interface unit reads to an external device, as initial values from the first and second latch circuits, gain values obtained by operating the AGC circuit by the AGC enable signal, and receives the read-out initial values from the external device, and outputs the values to the first and second switches.

* * * * *